United States Patent
Chujo et al.

(10) Patent No.: US 11,876,228 B2
(45) Date of Patent: Jan. 16, 2024

(54) ORGANIC SULFUR MATERIAL, ELECTRODE, AND LITHIUM-ION SECONDARY BATTERIES, AND PRODUCING METHOD

(71) Applicant: SUMITOMO RUBBER INDUSTRIES, LTD., Kobe (JP)

(72) Inventors: Fumiya Chujo, Kobe (JP); Tatsuya Kubo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 172 days.

(21) Appl. No.: 17/234,149

(22) Filed: Apr. 19, 2021

(65) Prior Publication Data

US 2021/0328224 A1  Oct. 21, 2021

(30) Foreign Application Priority Data

Apr. 20, 2020 (JP) .................. 2020-074883
Feb. 16, 2021 (JP) .................. 2021-022758

(51) Int. Cl.
*H01M 4/60* (2006.01)
*H01M 4/04* (2006.01)
(Continued)

(52) U.S. Cl.
CPC ......... *H01M 4/604* (2013.01); *H01M 4/0471* (2013.01); *H01M 10/0525* (2013.01); *H01M 2004/021* (2013.01)

(58) Field of Classification Search
CPC ....... H01M 10/0525; H01M 2004/021; H01M 4/0471; H01M 4/13; H01M 4/604; Y02E 60/10
See application file for complete search history.

(56) References Cited

U.S. PATENT DOCUMENTS

2002/0055040 A1* 5/2002 Mukherjee ............ H01M 4/131
                                                            429/223
2011/0200875 A1   8/2011 Miyuki et al.
(Continued)

FOREIGN PATENT DOCUMENTS

CN          1396202 A        2/2003
CN        108598369 A  *    9/2018
(Continued)

OTHER PUBLICATIONS

Machine Translation CN108598639A (Year: 2018).*
(Continued)

*Primary Examiner* — Victoria H Lynch
(74) *Attorney, Agent, or Firm* — Birch, Stewart, Kolasch & Birch, LLP

(57) ABSTRACT

Provided is an organic sulfur material comprising a sulfur-modified acrylic resin, wherein an acrylic resin is at least one polymer selected from the group consisting of (a) a polymer of at least one selected from the group consisting of acrylate compounds represented by $CH_2=C(R^{11})COOR^{12}$, wherein $R^{11}$ is a hydrogen atom or a methyl group and $R^{12}$ is an alkyl group, and (b) a polymer of at least one selected from the group consisting of acrylate compounds above and at least one selected from the group consisting of diacrylate compounds represented by $CH_2=C(R^{21})COO-Y-OCO(R^{22})C=CH_2$, wherein each of $R^{21}$ and $R^{22}$ is the same or different and is a methyl group, etc., Y is a hydrocarbylene group, etc., wherein the hydrocarbylene group may have a substituent selected from a hydroxyl group and an alkyl group.

18 Claims, 3 Drawing Sheets

(51) Int. Cl.
  *H01M 10/0525*   (2010.01)
  *H01M 4/02*   (2006.01)

(56) References Cited

U.S. PATENT DOCUMENTS

| 2013/0307485 A1* | 11/2013 | He | H01M 10/446 |
| | | | 320/130 |
| 2016/0177087 A1* | 6/2016 | Matsuoka | C08J 5/00 |
| | | | 525/190 |
| 2016/0293955 A1 | 10/2016 | Hochi et al. | |
| 2019/0312263 A1 | 10/2019 | Liu et al. | |

FOREIGN PATENT DOCUMENTS

| JP | 2010-153296 A | 7/2010 | | |
| JP | 2014-179179 A | 9/2014 | | |
| JP | 2015-92449 A | 5/2015 | | |
| JP | 2016-6742 A | 1/2016 | | |
| WO | WO 2010/044437 A1 | 4/2010 | | |
| WO | WO 2010/044437 A8 | 4/2010 | | |
| WO | WO-2019160993 A1 * | 8/2019 | | H01G 11/06 |

OTHER PUBLICATIONS

Machine Translation CN1396202A (Year: 2003).*
Japanese Office Action for Japanese Application No. 2021-022758, dated Apr. 5, 2022, with English translation.

\* cited by examiner

ORGANIC SULFUR MATERIAL, ELECTRODE, AND LITHIUM-ION SECONDARY BATTERIES, AND PRODUCING METHOD

TECHNICAL FIELD

The present invention relates to a novel organic sulfur material, an electrode comprising the organic sulfur material, and a lithium-ion secondary battery comprising the electrode, and a producing method thereof.

BACKGROUND OF THE INVENTION

Since the lithium-ion secondary battery has a large charge/discharge capacity, it has been mainly used as a battery for a portable electronic device. In addition, an increasing amount of the lithium-ion secondary battery has been used as a battery for an electric vehicle and has been expected to improve in performance.

WO 2010/044437 describes a positive electrode active material for a lithium-ion secondary battery obtained by heating a raw material powder comprising a sulfur powder and a polyacrylonitrile powder under a non-oxidizing atmosphere. Moreover, J P 2015-092449 A aims to provide a positive electrode active material at low cost by using an industrial rubber.

On the other hand, for a negative electrode active material, it has been proposed to increase a battery capacity of the lithium-ion secondary battery by using a material, such as silicon (Si) and tin (Sn), that can occlude and release more lithium ions.

SUMMARY OF THE INVENTION

However, the positive electrode active material in WO 2010/044437 has a problem that it is difficult to provide a lithium-ion secondary battery at low cost, since polyacrylonitrile, which is a raw material, is expensive, in particular, polyacrylonitrile with stable quality is more expensive. The positive electrode active material in JP 2015-092449 A still has a problem in sufficiently improving cycle characteristics. The above-described material that has been proposed as a negative electrode active material has a problem that the cycle characteristics when repeatedly charging and discharging is not good because a volume change due to occlusion and release of lithium ions is large. In addition, though carbon materials such as graphite and hard carbon are also used, the theoretical capacity has been almost reached already, and a significant capacity improvement cannot be expected.

It is an object of the present invention to provide a novel organic sulfur material which is capable of improving a charge/discharge capacity and cycle characteristics of a lithium-ion secondary battery, an electrode comprising the organic sulfur material, that is, a positive electrode or a negative electrode, and a lithium-ion secondary battery comprising the electrode, and a producing method thereof.

As a result of intensive studies to solve the above-described problem, the present inventors have found that if a predetermined acrylic resin is modified with sulfur, an organic sulfur material which exhibits excellent characteristics can be obtained, and conducted further studies to complete the present invention.

That is, the present invention relates to

[1] An organic sulfur material comprising:
a sulfur-modified acrylic resin,
wherein an acrylic resin is at least one polymer selected from the group consisting of:
(a) a polymer of at least one selected from the group consisting of acrylate compounds represented by the following formula (1) and
(b) a polymer of at least one selected from the group consisting of acrylate compounds represented by the following formula (1) and at least one selected from the group consisting of diacrylate compounds represented by the following formula (2), $$CH_2=C(R^{11})COOR^{12} \quad (1)$$

(wherein, $R^{11}$ is a hydrogen atom or a methyl group, and $R^{12}$ is an alkyl group.)

$$CH_2=C(R^{21})COO-Y-OCO(R^{22})C=CH_2 \quad (2)$$

(wherein, each of $R^{21}$ and $R^{22}$ is the same or different and is a hydrogen atom or a methyl group, Y is a hydrocarbylene group, wherein the hydrocarbylene group may have at least one substituent selected from the group consisting of a hydroxyl group and an alkyl group, and a carbon skeleton constituting the hydrocarbylene group may have an ether bond with an oxygen atom. However, when there are two or more ether bonds, two or more carbon atoms always intervene between the adjacent oxygen atoms),

[2] The organic sulfur material of [1] above, wherein the modification is performed by calcination under a non-oxidizing atmosphere,

[3] The organic sulfur material of [1] or [2] above, wherein $R^{12}$ is an alkyl group having 1 to 6 carbon atoms, wherein Y is a hydrocarbylene group having 2 to 6 carbon atoms, preferably 2 or 3 carbon atoms, wherein the hydrocarbylene group has 1 to 4 substituents, preferably 1 or 2 substituents, wherein the alkyl group, which is a substituent, has 1 to 4 carbon atoms, preferably 1 carbon atom, and wherein the carbon skeleton constituting the hydrocarbylene group has 1 to 2 ether bonds, preferably 1 or 2 ether bonds,

[4] The organic sulfur material of any one of [1] to [3] above, wherein a particle size of the acrylic resin is 0.1 to 300.0 μm, preferably 1.0 to 270.0 μm, more preferably 1.0 to 200.0 μm, further preferably 1.0 to 100.0 pin, further preferably 1.0 to 50.0 μm, further preferably 1.0 to 20.0 μm, further preferably 1.0 to 15.0 μm,

[5] The organic sulfur material of any one of [1] to [4] above, wherein the acrylic resin has a porous structure,

[6] The organic sulfur material of any one of [1] to [5] above, wherein, in a Raman spectrum detected by Raman spectroscopy, there exists a main peak around 1450 cm$^{-1}$, and there exists other peaks around 485 cm$^{-1}$, around 1250 cm$^{-1}$, and around 1540 cm$^{-1}$ in a range of 200 to 1800 cm$^{-1}$,

[7] The organic sulfur material of [6] above, wherein, in the Raman spectrum, with a straight line connecting an intensity of 1000 cm$^{-1}$ and an intensity of 1800 cm$^{-1}$ being as a baseline, when a difference (11450) between a peak intensity around 1450 cm$^{-1}$ and a corresponding baseline intensity and a difference (11540) between a peak intensity around 1540 cm$^{-1}$ and a corresponding baseline intensity are calculated, a value of $I_{1450}/I_{1540}$ is in a range of 1 to 4,

[8] The organic sulfur material of any one of [1] to [7] above, wherein an amount of sulfur in the organic sulfur material is 50.0% by mass or more, more preferably 53.0% by mass or more, further preferably 55.0% by mass or more, further preferably 56.0% by mass or more, further preferably 59.0% by mass or more,

[9] The organic sulfur material of any one of [1] to [8] above, wherein the acrylic resin is at least one polymer selected from the group consisting of a polymer of at least one selected from the group consisting of acrylate compounds represented by the formula (1),

[10] An electrode comprising the organic sulfur material of any one of [1] to [9] above,

[11] A lithium-ion secondary battery comprising the electrode of [10] above,

[12] A method of producing an organic sulfur material, the method comprising steps of:
(1) preparing an acrylic resin, and
(2) modifying the acrylic resin with sulfur,
wherein the acrylic resin is at least one polymer selected from the group consisting of:
(a) a polymer of at least one selected from the group consisting of acrylate compounds represented by the following formula (1) and
(b) a polymer of at least one selected from the group consisting of acrylate compounds represented by the following formula (1) and at least one selected from the group consisting of diacrylate compounds represented by the following formula (2),

$$CH_2=C(R^{11})COOR^{12} \quad (1)$$

(wherein, $R^{11}$ is a hydrogen atom or a methyl group, and $R^{12}$ is an alkyl group.)

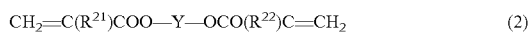

$$CH_2=C(R^{21})COO-Y-OCO(R^{22})C=CH_2 \quad (2)$$

(wherein, each of $R^{21}$ and $R^{22}$ is the same or different and is a hydrogen atom or a methyl group, Y is a hydrocarbylene group, wherein the hydrocarbylene group may have at least one substituent selected from the group consisting of a hydroxyl group and an alkyl group, and a carbon skeleton constituting the hydrocarbylene group may have an ether bond with an oxygen atom. However, when there are two or more ether bonds, two or more carbon atoms always intervene between the adjacent oxygen atoms),

[13] The method of [12] above, wherein the modification is performed by calcination under a non-oxidizing atmosphere,

[14] The method of [12] or [13] above, wherein an amount of the sulfur with respect to the acrylic resin is 50 to 1000 parts by mass based on 100 parts by mass of the acrylic resin,

[15] The method of any one of [13] or [14] above, wherein a temperature of the calcination is 250 to 550° C.,

[16] The method of any one of [12] to [15] above, wherein a particle size of the acrylic resin is 0.1 to 300.0 μm, preferably 1.0 to 270.0 μm, more preferably 1.0 to 200.0 μm, further preferably 1.0 to 100.0 μm, further preferably 1.0 to 50.0 μm, further preferably 1.0 to 20.0 μm, further preferably 1.0 to 15.0 μm,

[17] The method of any one of [12] to [16] above, wherein the acrylic resin has a porous structure,

[18] A method of producing an electrode, the method further comprising, after producing the organic sulfur material by the method of any one of [12] to [17] above, a step of:

(3) preparing an electrode using the organic sulfur material by a conventional method,

[19] A method of producing a lithium-ion secondary battery, the method further comprising, after producing the electrode by the method of [18] above, a step of:
(4) preparing a lithium-ion secondary battery using the electrode by a conventional method.

According to the present invention, a novel organic sulfur material which is capable of improving charge/discharge capacity and cycle characteristics, an electrode comprising the organic sulfur material, that is, a positive electrode or a negative electrode, and a lithium-ion secondary battery comprising the electrode can be provided.

In the present specification, the "cycle characteristics" refers to characteristics of maintaining charge/discharge capacity of a secondary battery despite repeated charging/discharging. Therefore, a secondary battery having a large degree of decrease in charge/discharge capacity and a low capacity retention with the repeated charging/discharging is inferior in cycle characteristics, while on the other hand, a secondary battery having a small degree of decrease in charge/discharge capacity and a high capacity retention is excellent in cycle characteristics.

DETAILED DESCRIPTION

Figure 1:
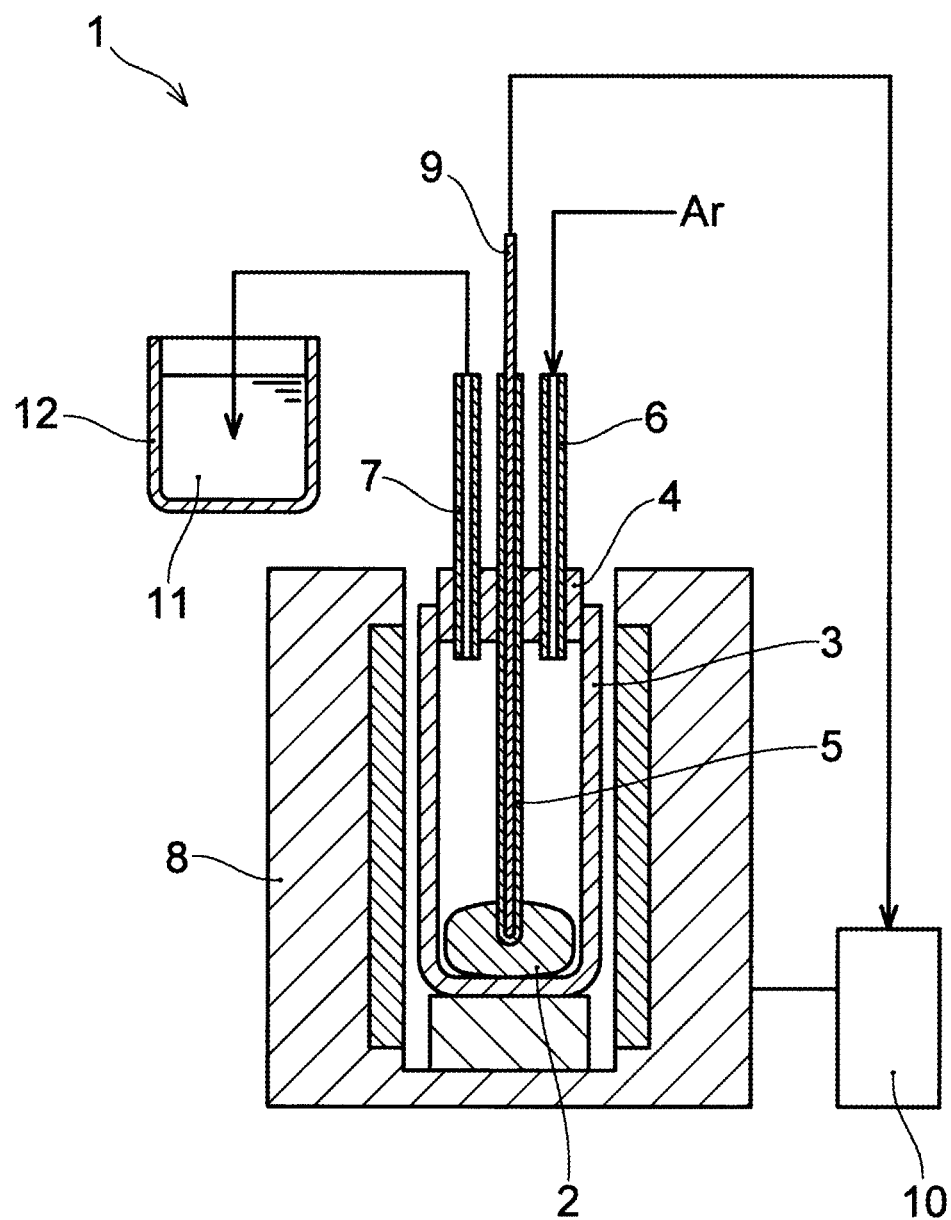
FIG. 1 is a schematically shown cross-sectional view of a reaction apparatus used for producing an organic sulfur material in Examples of the present invention.

Hereinafter, a structure of the present disclosure will be described in detail. Besides, a numerical value of an upper limit relating to "or less (lower)" or "to" and a numerical value of a lower limit relating to "or more (higher)" or "to" with respect to description of a numerical range are numerical values which can be arbitrarily combined, and a numerical value in Examples can also be used as an upper or a lower limit. In addition, a numerical range identified with "to" means to include the numerical values of both ends, unless otherwise specified.

One embodiment of the present disclosure is an organic sulfur material, the organic sulfur material being obtained by modifying an acrylic resin with sulfur, wherein the acrylic resin is at least one polymer selected from the group consisting of (a) a polymer obtained by polymerizing at least one selected from the group consisting of acrylate compounds represented by the formula (1) and (b) a polymer obtained by polymerizing at least one selected from the group consisting of acrylate compounds represented by the formula (1) and at least one selected from the group consisting of diacrylate compounds represented by the formula (2).

Another embodiment of the present disclosure is an electrode comprising the organic material.

Another embodiment of the present disclosure is a lithium-ion secondary battery comprising the electrode.

Another embodiment of the present disclosure is a method of producing an organic sulfur material, the method comprising steps of:
  (1) preparing an acrylic resin, and
  (2) modifying the acrylic resin with sulfur,
  wherein the acrylic resin is at least one polymer selected from the group consisting of:
    (a) a polymer obtained by polymerizing at least one selected from the group consisting of acrylate compounds represented by the formula (1) and
    (b) a polymer obtained by polymerizing at least one selected from the group consisting of acrylate compounds represented by the formula (1) and at least one selected from the group consisting of diacrylate compounds represented by the formula (2).

Another embodiment of the present disclosure is a method of producing an electrode, the method further comprising, after producing the organic sulfur material by the method above, a step of:
  (3) preparing an electrode using the organic sulfur material by a conventional method.

Another embodiment of the present disclosure is a method of producing a lithium-ion secondary battery, the method further comprising, after producing the electrode by the method above, a step of:
  (4) preparing a lithium-ion secondary battery using the electrode by a conventional method.

<Acrylic Resin>

In the present disclosure, the acrylic resin is at least one polymer selected from the group consisting of (a) a polymer obtained by polymerizing at least one selected from the group consisting of acrylate compounds represented by the following formula (1) and (b) a polymer obtained by polymerizing at least one selected from the group consisting of acrylate compounds represented by the following formula (1) and at least one selected from the group consisting of diacrylate compounds represented by the following formula (2),

(wherein, $R^{11}$ is a hydrogen atom or a methyl group, and $R^{12}$ is an alkyl group)

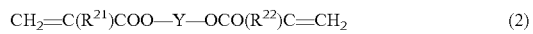

(wherein, each of $R^{21}$ and $R^{22}$ is the same or different and is a hydrogen atom or a methyl group, Y is a hydrocarbylene group, wherein the hydrocarbylene group may have at least one substituent selected from the group consisting of a hydroxyl group and an alkyl group, and a carbon skeleton constituting the hydrocarbylene group may have an ether bond with an oxygen atom. However, when there are two or more ether bonds, two or more carbon atoms always intervene between the adjacent oxygen atoms.)

In the formula (1), $R^{11}$ is preferably a methyl group, $R^{12}$ is preferably an alkyl group having 1 to 6 carbon atoms, more preferably 1 to 4 carbon atoms, and, among them, a methyl group, an n-butyl group, an i-butyl group, or a t-butyl group is preferable. Examples of the compound represented by the formula (1) include, for example, methyl (meth) acrylate, butyl (meth)acrylate, and the like, more preferably, methyl methacrylate and butyl methacrylate. Here, "(meth) acrylate" in methyl (meth)acrylate and butyl (meth)acrylate means either "acrylate" or "methacrylate" (the same shall apply hereinafter). A more preferred example of the compound represented by the formula (1) is butyl methacrylate.

In the formula (2), both $R^{21}$ and $R^{22}$ are preferably methyl groups. The hydrocarbylene group of Y preferably has 2 to 6 carbon atoms, more preferably 2 or 3 carbon atoms. Y preferably has 1 to 4 substituents, more preferably 1 or 2 substituents. The substituent of Y is preferably one or more substituents selected from the group consisting of a hydroxyl group and an alkyl group having 1 to 4 carbon atoms, and this alkyl group having 1 to 4 carbon atoms is preferably a methyl group. When the carbon skeleton of Y has an ether bond with an oxygen atom, for example, a portion corresponding to —Y—O— is preferably represented by the following formula (3) (However, in the formula (3), the substituent of Y is not taken into consideration).

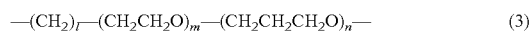

(wherein, l is 0 to 6, m is 0 to 3, and n is 0 to 2. However, l, m, and n cannot be 0 at the same time.)

In the formula (3), it is preferable that l is 1, 2, 3, 4, 5, or 6, and m and n are 0; or m is 1, 2, or 3, and l and n are 0; or n is 1 or 2, and l and m are 0.

Examples of the compound represented by the formula (2) include, for example, ethylene glycol di(meth)acrylate, diethylene glycol di(meth)acrylate, triethylene glycol di(meth)acrylate, 1,6-hexanediol di(meth)acrylate, neopentyl glycol di(meth)acrylate, glycerin di(meth)acrylate, and the like. Among them, ethylene glycol dimethacrylate is preferable.

Preferred examples of the acrylic resin include a homopolymer of methyl (meth)acrylate, a homopolymer of butyl (meth)acrylate, a copolymer of methyl (meth)acrylate and ethylene glycol di(meth)acrylate, a copolymer of butyl (meth)acrylate and ethylene glycol di(meth)acrylate, and the like. Among them, as the acrylic resin, a methacrylate type of acrylic resin is preferable. More preferred examples of the acrylic resin include a copolymer of butyl methacrylate and ethylene glycol dimethacrylate.

The acrylic resin can be used alone or two or more thereof can be used in combination.

(Form of Acrylic Resin)

In the present disclosure, the acrylic resin is preferably in a form of a fine particle. Here, the fine particle refers to a particle having a particle size of 300.0 μm or less. The particle size is preferably 270.0 μm or less, more preferably 200.0 μm or less, further preferably 100.0 μm or less, further preferably 50.0 μm or less, further preferably 20.0 μm or less, further preferably 15.0 μm or less, further preferably 13.0 μm or less, further preferably 10.0 μm or less, further preferably 6.0 μm or less. On the other hand, a lower limit of the particle size is not particularly limited, but is usually, for example, 0.1 μm or more, preferably 1.0 μm or more. The particle size is a value measured by a precise particle size distribution measuring device, Multisizer 3 manufactured by Beckman Coulter, Inc.

The acrylic resin may be a spherical fine particle or a porous fine particle. When the acrylic resin is a porous fine particle, an oil absorption amount thereof is preferably 100 ml/100 g or more, more preferably 110 ml/100 g or more, further preferably 120 ml/100 g or more, further preferably 130 ml/100 g or more, further preferably 140 ml/100 g or more. The oil absorption amount is a value measured according to JIS K 5101-13-2: 2004. More specifically, it can be measured by the method in Paragraph 0069 of JP 2017-88501 A.

(Weight-Average Molecular Weight (Mw) of Acrylic Resin)

A Mw of the acrylic resin is not particularly limited as long as the acrylic resin has the above-described structure. However, the Mw of the acrylic resin is usually in a range of 2000 to 1500000. The Mw is a value measured by gel permeation chromatography (GPC) (calibrated with polystyrene).

(Availability or Producing of Acrylic Resin)

The acrylic resin is commercially available or can be produced by a conventional method which is within a knowledge of a person skilled in the art. Examples of the commercially available acrylic resin include, for example, those manufactured by Sekisui Kasei Co., Ltd.

<Sulfur>

As sulfur, those in various forms such as a powdered sulfur, an insoluble sulfur, a precipitated sulfur, and a colloidal sulfur can be used. Among them, a precipitated sulfur and a colloidal sulfur are preferable. A compounding amount of sulfur is preferably 50 parts by mass or more, more preferably 100 parts by mass or more, further preferably 150 parts by mass or more, further preferably 200 parts by mass, further preferably 250 parts by mass or more, based on 100 parts by mass of the acrylic resin. When it is 100 parts by mass or more, the charge/discharge capacity and cycle characteristics tend to be improved. On the other hand, the compounding amount of sulfur is not particularly limited, but is usually 1000 parts by mass or less, preferably 750 parts by mass or less, more preferably 500 parts by mass or less, further preferably 400 parts by mass or less, further preferably 350 parts by mass or less. When it is 1000 parts by mass or less, there is a tendency that it is advantageous in terms of cost.

<Conductive Carbon Material>

When the acrylic resin is modified with sulfur, a conductive carbon material may be added to the acrylic resin in advance. This is because the conductivity of the organic sulfur material can be improved. As such a conductive carbon material, a carbon material having a graphite structure is preferable. As the carbon material, one having a condensed aromatic ring structure such as, for example, carbon black, acetylene black, ketjen black, graphite, carbon nanotube (CNT), carbon fiber (CF), graphene, and fullerene can be used. The conductive carbon material can be used alone or two or more thereof can be used in combination.

Among them, acetylene black, carbon black, and ketjen black are preferable because they are inexpensive and excellent in dispersibility. Moreover, a small amount of CNT, graphene or the like may be used in combination with acetylene black, carbon black, or ketjen black. With such combination, it becomes possible to further improve the cycle characteristics of the lithium-ion secondary battery without significantly increasing the cost. Besides, the amount of CNT or graphene used in combination is preferably 8% by mass or more and 12% by mass or less of a total amount of the conductive carbon material.

A compounding amount of the conductive carbon material is preferably 5 parts by mass or more, more preferably 10 parts by mass or more, based on 100 parts by mass of the acrylic resin. When the compounding amount is 5 parts by mass or more, there is a tendency to easily achieve the purpose of further improving the charge/discharge capacity and the cycle characteristics. On the other hand, the compounding amount is preferably 50 parts by mass or less, more preferably 40 parts by mass or less. When it is 50 parts by mass or less, there is a tendency to easily achieve the purpose of further improving the charge/discharge capacity and cycle characteristics without relatively decreasing a ratio of a structure comprising sulfur in the organic sulfur material.

<Other Materials>

When the acrylic resin is modified with sulfur, other materials usually used in this field may be added to the acrylic resin in advance, if desired.

<Production of Organic Sulfur Material>

In the present disclosure, the organic sulfur material can be produced by modifying a predetermined acrylic resin with sulfur.

(Preparation of Raw Material)

For modification, it is desirable that an acrylic resin and sulfur are sufficiently mixed in advance. Where a conductive carbon material and the like are added to the acrylic resin in advance, these additives are also mixed together. The mixing can be performed by a conventional method using, for example, a high-speed blender or the like. On the other hand, an acrylic resin, sulfur, and, if desired, additives can be molded in a pellet-shape.

(Non-Oxidizing Atmosphere)

The modification is preferably performed under a non-oxidizing atmosphere. The non-oxidizing atmosphere refers to an atmosphere that does not substantially comprise oxygen and is adopted to suppress oxidative deterioration and excessive thermal decomposition of constituents. Specifically, it refers to an atmosphere of an inert gas such as nitrogen or argon, an atmosphere of sulfur gas, or the like. Therefore, the modification is performed, for example, in a quartz tube under an inert gas atmosphere.

(Modification Method)

Modification of acrylic resin with sulfur can be performed by a conventional method, for example, by calcinating an acrylic resin and sulfur. The calcination can be performed by a conventional method. For example, the calcination can be performed by heating a calcinating raw material (including an acrylic resin, sulfur, and, if desired, additives) at a predetermined temperature rising rate until reaching a predetermined temperature, maintaining them at the predetermined temperature for a predetermined period of time, and then naturally cooling them.

[Temperature Rising Rate]

A temperature rising rate is preferably in a range of, for example, 50 to 500° C./h. The temperature rising rate is more preferably 100° C./h or higher. On the other hand, the temperature rising rate is more preferably 400° C./h or lower, further preferably 300° C./h or lower, further preferably 200° C./h or lower. When the temperature rising rate is within such ranges, there is a tendency to easily achieve the purpose of improving the charge/discharge capacity and the cycle characteristics.

[Calcinating Temperature/Time]

The calcinating temperature is a temperature after completion of temperature rise and to be maintained for a certain period of time for calcinating a raw material. The temperature is preferably in a range of 250 to 550° C. When the temperature is 250° C. or higher, an insufficient vulcanization reaction can be avoided, and there is a tendency that a decrease in charge/discharge capacity of an objective material can be prevented. On the other hand, when the temperature is 550° C. or lower, decomposition of a calcinated raw material is prevented, and there is a tendency that a decrease in yield and a decrease in charge/discharge capacity can be prevented. The temperature is more preferably 300° C. or higher, further preferably 350° C. or higher.

On the other hand, the temperature is more preferably 500° C. or lower, more preferably 450° C. or lower. A time for maintaining at a calcinating temperature may be appropriately set according to a type of a calcinating raw material, a calcinating temperature, etc., but is preferably 1 to 6 hours, for example. When it is 1 hour or more, there is a tendency that calcination can be proceeded sufficiently, and when it is 6 hours or less, there is a tendency that excessive thermal decomposition of the constituents can be prevented.

[Apparatus]

Calcination can be performed by using an apparatus shown in FIG. 1, as well as, for example, a continuous type apparatus such as a twin-screw extruder. When the continuous type apparatus is used, there is an advantage that an organic sulfur material can be continuously produced by a series of operations, such as by kneading, pulverizing and mixing a raw material with calcination in the apparatus.

(Step of Removing Residue)

Unreacted sulfur which was precipitated by cooling from sulfur sublimated during calcination, etc., remain in a processed product obtained after calcination. It is desirable to remove these residues as much as possible because they cause deterioration in cycle characteristics. The removal of the residues can be performed according to a conventional method such as pressure reduced heat drying, warm air drying, and solvent washing.

(Pulverization, Classification)

The obtained organic sulfur material can be pulverized so as to have a predetermined particle size and classified into a particle having a size suitable for producing an electrode. A preferred particle size distribution of the particle is about 5 to 40 μm in median diameter. Besides, in the calcinating method using the twin-screw extruder described above, pulverization of the produced organic sulfur material can be performed by shearing during kneading at the same time as production of the organic sulfur material.

<Organic Sulfur Material>

The organic sulfur material thus obtained comprises carbon and sulfur as main components, and the larger the amount of sulfur is, the better the charge/discharge capacity and cycle characteristics tend to improve. Therefore, it is preferable that the content of sulfur is as high as possible. Generally, a range of the amount of sulfur is preferably 50.0% by mass or more, more preferably 53.0% by mass or more, further preferably 55.0% by mass or more, further preferably 56.0% by mass or more, further preferably 59.0% by mass or more, in the organic sulfur material. However, when a conductive carbon material is compounded, an effect of improving the charge/discharge capacity and cycle characteristics may be expected even if the content of sulfur becomes somewhat lower due to an influence of carbon constituting the conductive carbon material. The content of sulfur in such case may be lower than the above-mentioned sulfur content by about 5.0% by mass. A total amount of carbon and sulfur in the organic sulfur material is preferably 90% by mass or more, more preferably 92% by mass or more, further preferably 94% by mass or more.

In addition, hydrogen (H) in the acrylic resin reacts with sulfur by calcination to become hydrogen sulfide, which disappears from the sulfide. Therefore, a hydrogen content in the organic sulfur material is preferably 1.8% by mass or less, further preferably 1.6% by mass or less. When it is 1.8% by mass or less, calcination (vulcanization reaction) tends to be sufficient, and furthermore, when it is 1.6% by mass or less, calcination (vulcanization reaction) tends to be more sufficient. Therefore, in this case, the charge/discharge capacity tends to improve. The hydrogen content is more preferably 1.0% by mass or less, further preferably 0.5% by mass or less. In the present specification, a content of an element is measured by elemental analysis according to a conventional method.

Figure 2:
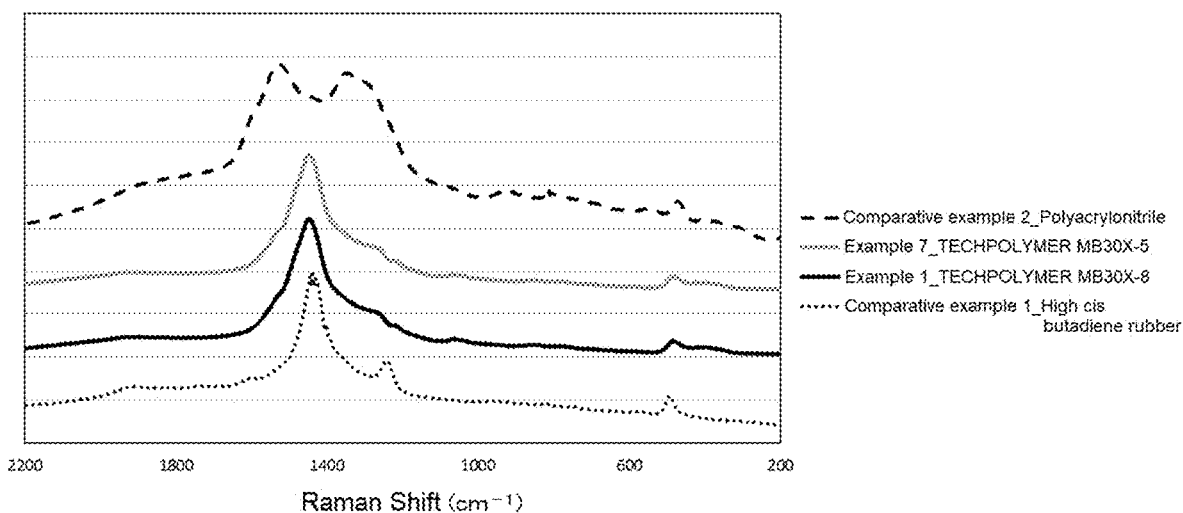
FIG. 2 parallelly shows profiles of Raman spectra for the organic sulfur materials in Examples 1 and 2 and Comparative examples 1 and 2 under the same horizontal axis (Raman shift (cm$^{-1}$)) so that their peak positions can be compared.

In the organic sulfur material, it is preferable that, in a Raman spectrum detected by Raman spectroscopy, there exists a main peak around 1450 cm$^{-1}$, and there exists other peaks around 485 cm$^{-1}$, around 1250 cm$^{-1}$, and around 1540 cm$^{-1}$ in a range of 200 to 1800 cm$^{-1}$. In this regard, the Raman spectra in Examples 1 and 2 and Comparative examples 1 and 2 are shown in FIG. 2. Besides, in the peak positions of the Raman spectra, "around" means allowing an error range of ±50 cm$^{-1}$, especially ±30 cm$^{-1}$.

Figure 3:
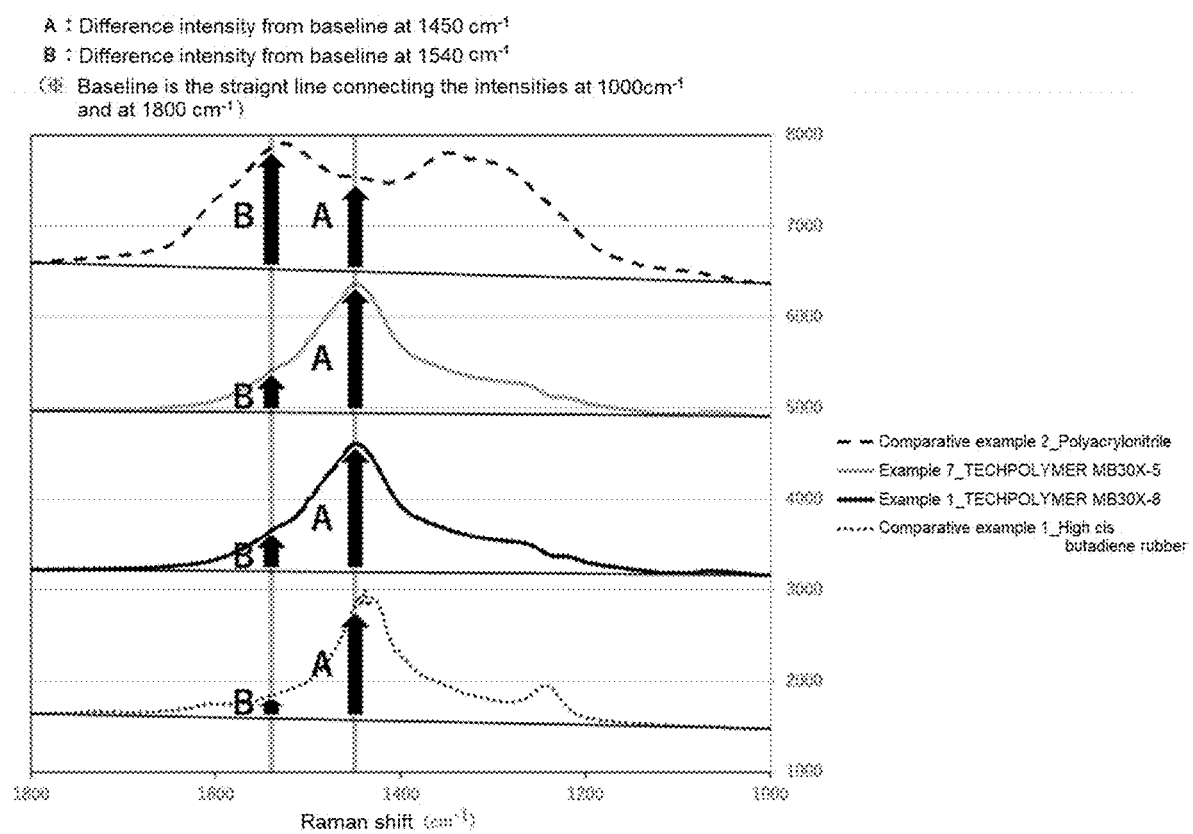
FIG. 3 represents a profile of each Raman spectrum in FIG. 2 so that a value of $I_{1450}/I_{1540}$ can be grasped on a graph. Here, $I_{1450}$ is a difference between a peak intensity around 1450 cm$^{-1}$ and a corresponding baseline intensity (A in the figure), and $I_{1540}$ is a difference between a peak intensity around 1540 cm$^{-1}$ and a corresponding baseline intensity (B in the figure). Besides, the baseline is a straight line drawn almost horizontally in the figure and connecting an intensity of 1000 cm$^{-1}$ and an intensity of 1800 cm$^{-1}$ in each profile.

Moreover, with respect to the organic sulfur material, in the Raman spectrum, with a straight line connecting an intensity of 1000 cm$^{-1}$ and an intensity of 1800 cm$^{-1}$ being as a baseline, when a difference ($I_{1430}$) between a peak intensity around 1450 cm$^{-1}$ and a corresponding baseline intensity and a difference ($I_{1540}$) between a peak intensity around 1540 cm$^{-1}$ and a corresponding baseline intensity are calculated, a value of $I_{1450}/I_{1540}$ is preferably in a range of 1 to 4. In this regard, FIG. 3 is shown as representing the values of $I_{1450}/I_{1540}$ in Examples 1 and 7 and Comparative examples 1 and 2 so that they can be grasped on a graph. The values of A/B shown in FIG. 3 are values of $I_{1450}/I_{1540}$.

The values of $I_{1450}/I_{1540}$ for Examples 1 and 7 and Comparative examples 1 and 2 are as shown in Table 1 below.

TABLE 1

|  | Example | | Comparative example | |
| --- | --- | --- | --- | --- |
|  | 1 | 7 | 1 | 2 |
| $I_{1450}/I_{1540}$ | 2.62 | 3.16 | 4.99 | 0.77 |

The value of $I_{1450}/I_{1540}$ is more preferably 1.20 or more, further preferably 1.40 or more, further preferably 1.50 or more, further preferably 2.00 or more, further preferably 2.50 or more, from the viewpoint of the effects of the present disclosure. On the other hand, the value is preferably 3.80 or less, more preferably 3.60 or less, further preferably 3.50 or less, further preferably 3.20 or less.

In the present disclosure, the Raman spectrum can be measured by RMP-320 (excitation wavelength λ=532 nm, grating: 1800 gr/mm, resolution: 3 cm$^{-1}$) manufactured by JASCO Corporation.

<Lithium-Ion Secondary Battery>

The organic sulfur material of the present disclosure can be used as an electrode active material of a lithium-ion secondary battery, that is, as a positive electrode active material or a negative electrode active material. That is, an electrode for a lithium-ion secondary battery can be produced in the similar manner as in the case of producing a general electrode for a lithium-ion secondary battery except that the organic sulfur material is used, and a lithium-ion secondary battery can be further produced in the similar manner as in the case of producing a general lithium-ion secondary battery except that the electrode for a lithium-ion secondary battery is used. The lithium-ion secondary battery thus produced has a large charge/discharge capacity and excellent cycle characteristics.

1. Using an Organic Sulfur Material as a Positive Electrode Active Material

The lithium-ion secondary battery of the present disclosure can be produced according to a conventional method by using a negative electrode, an electrolyte, and, if desired, a member such as a separator, in addition to a positive electrode comprising the above-described organic sulfur material (positive electrode active material).

(Positive Electrode)

The positive electrode for a lithium-ion secondary battery can be produced in the similar manner as for a general positive electrode for a lithium-ion secondary battery except that the above-described organic sulfur material is used as a positive electrode active material. For example, the positive electrode can be produced by mixing a particulate organic sulfur material with a conductive auxiliary agent, a binder, and solvent to prepare a paste-like positive electrode material and applying the positive electrode material to a current collector, followed by drying it. Moreover, as another method, the positive electrode can be produced by, for example, kneading an organic sulfur material together with a conductive auxiliary agent, a binder, and a small amount of solvent in a mortar or the like into a film shape, followed by pressing it to a current collector with a press machine or the like.

[Conductive Auxiliary Agent]

Examples of the conductive auxiliary agent include, for example, a vapor grown carbon fiber (VGCF), a carbon powder, carbon black (CB), acetylene black (AB), ketjen black (KB), graphite, or a fine powder of a metal which is stable at a positive potential of aluminum, titanium and the like. These conductive auxiliary agents can be used alone or two or more thereof can be used in combination.

[Binder]

Examples of the binder include polyvinylidene fluoride (Polyvinylidene Difluoride: PVDF), polytetrafluoroethylene (PTFE), a styrene-butadiene rubber (SBR), polyimide (PI), polyamide-imide (PAI), carboxymethyl cellulose (CMC), polyvinyl chloride (PVC), an acrylic resin, a methacrylic resin (PMA), polyacrylonitrile (PAN), a modified polyphenylene oxide (PPO), polyethylene oxide (PEO), polyethylene (PE), polypropylene (PP), and the like. These binders can be used alone or two or more thereof can be used in combination.

[Solvent]

Examples of solvent include N-methyl-2-pyrrolidone, N,N-dimethylformaldehyde, alcohol, hexane, water, and the like. These solvents can be used alone or two or more thereof can be used in combination.

[Compounding Amount]

A compounding amount of these materials constituting positive electrodes is not particularly limited, but it is preferable to compound, for example, 2 to 100 parts by mass of a conductive auxiliary agent, 2 to 50 parts by mass of a binder, and an appropriate amount of a solvent based on 100 parts by mass of the organic sulfur material.

[Current Collector]

As a current collector, those commonly used for a positive electrode for a lithium-ion secondary battery may be used. For example, examples of the current collector include those composed of an aluminum foil, an aluminum mesh, a punching aluminum sheet, an aluminum expand sheet, a stainless steel foil, a stainless steel mesh, a punching stainless steel sheet, a stainless steel expand sheet, a foamed nickel, a nickel non-woven fabric, a copper foil, a copper mesh, a punching copper sheet, a copper expand sheet, a titanium foil, a titanium mesh, a carbon non-woven fabric, a carbon woven fabric, and the like. Among them, a current collector composed of a carbon non-woven fabric or a carbon woven fabric composed of carbon with a high degree of graphitization is appropriate as a current collector when the organic sulfur material of the present disclosure is used as a positive electrode active material, since it does not comprise hydrogen and has a low reactivity with sulfur. As raw materials of a carbon fiber having a high degree of graphitization, various pitches (that is, by-products such as petroleum, coal, and coal tar) and a polyacrylonitrile fiber (PAN) which are materials of the carbon fiber, and the like can be used. The current collector may be used alone or two or more thereof may be used in combination.

(Negative Electrode)

As a negative electrode material, a known metal lithium, carbon-based materials such as graphite, silicon-based materials such as a silicon thin film, and alloy-based materials such as copper-tin and cobalt-tin can be used. When lithium-free materials, for example, carbon-based materials, silicon-based materials, and alloy-based materials, among the above-described negative electrode materials, are used as the negative electrode materials, there is an advantage that a short circuit between the positive electrode and the negative electrode due to generation of dendrite is less likely to occur. However, when these lithium-free negative electrode materials are used in combination with the positive electrode of the present embodiment, neither the positive electrode nor the negative electrode comprises lithium. Therefore, pre-doping treatment is required, in which lithium is previously inserted in either or both of the positive electrode and the negative electrode. A pre-doping method for lithium may comply with a known method. For example, examples of the method includes a method of inserting lithium by an electrolytic doping method in which a semi-battery is assembled using metallic lithium as a counter electrode to electrochemically dope lithium when lithium is doped into the negative electrode, and a method of inserting lithium by an attaching pre-doping method in which a metallic lithium foil is left in an electrolytic solution after the foil is attached to the electrode to dope by diffusion of the lithium to the electrode. In addition, the above-described electrolytic doping method can also be employed when lithium is pre-doped into the positive electrode. As the lithium-free negative electrode materials, silicon-based materials, which are high-capacity negative electrode materials, are preferable, and among them, a thin-film silicon, which has a thin electrode thickness and has an advantage in terms of capacity per volume, is more preferable.

(Electrolyte)

As an electrolyte used in the lithium-ion secondary battery, those in which an alkali metal salt which is an electrolyte is dissolved in an organic solvent can be used. As the organic solvent, it is preferable to use at least one selected from non-aqueous solvents such as ethylene carbonate, propylene carbonate, dimethyl carbonate, diethyl carbonate, ethyl methyl carbonate, dimethyl ether, γ-butyrolactone, and acetonitrile. As the electrolyte, $LiPF_6$, $LiBF_4$, $LiAsF_6$, $LiCF_3SO_3$, LiI, $LiClO_4$, and the like can be used. A concentration of the electrolyte may be about 0.5 mol/L to 1.7 mol/L. Besides, the electrolyte is not limited to one in a liquid state. For example, when the lithium-ion secondary battery is a lithium polymer secondary battery, the electrolyte is in a solid state (for example, in a polymer gel state).

(Separator)

The lithium-ion secondary battery may comprise members such as a separator in addition to the above-mentioned negative electrode, positive electrode, and electrolyte. The separator intervenes between the positive electrode and the negative electrode to allow for movement of ions between the positive electrode and the negative electrode and prevents an internal short circuit between the positive electrode and the negative electrode. If the lithium-ion secondary battery is of a closed type, the separator is also required to have a function of retaining an electrolytic solution. As the separator, it is preferable to use a thin-walled and microporous or non-woven film made of polyethylene, polypropylene, polyacrylonitrile, aramid, polyimide, cellulose, glass, and the like.

(Shape)

A shape of the lithium-ion secondary battery is not particularly limited, and various shapes such as a cylindrical type, a laminated type, a coin type, and a button type can be used.

2. Using the Organic Sulfur Material as a Negative Electrode Active Material

The lithium-ion secondary battery of the present disclosure can be produced according to a conventional method by using a positive electrode, an electrolyte, and, if desired, a member such as a separator, in addition to a negative electrode comprising the above-described organic sulfur material (negative electrode active material).

(Negative Electrode)

The negative electrode for a lithium-ion secondary battery can be produced in the similar manner as for a general negative electrode for a lithium-ion secondary battery except that the above-described organic sulfur material is used as a negative electrode active material. For example, the negative electrode can be produced by mixing a particulate organic sulfur material with a conductive auxiliary agent, a binder, and solvent to prepare a paste-like negative electrode material and applying the negative electrode material to a current collector, followed by drying it. Moreover, as another method, the negative electrode can be produced by, for example, kneading an organic sulfur material together with a conductive auxiliary agent, a binder, and a small amount of solvent in a mortar or the like into a film shape, followed by pressing it to a current collector with a press machine or the like.

As the conductive auxiliary agent, binder and solvent, those similar as in the above-described case where the organic sulfur material is used as a positive electrode active material can be used in the similar manner, and the same applies to the current collector.

(Positive Electrode)

The positive electrode material is not particularly limited as long as it is, for example, a transition metal oxide comprising lithium or a solid solution oxide, or a substance that can electrochemically occlude and release lithium ions. Examples of the transition metal oxide comprising lithium can include, for example, a Li/Co-based composite oxide such as $LiCoO_2$, a Li/Ni/Co/Mn-based composite oxide such as $LiNi_xCo_yMn_zO_2$, a Li/Ni-based composite oxide such as $LiNiO_2$, a Li/Mn-based composite oxide such as $LiMn_2O_4$, or the like. Examples of the solid solution oxide can include, for example, $Li_aMn_xCo_yNi_zO_2$ ($1.150 \leq a \leq 1.430$, $0.450 \leq x \leq 0.600$, $0.100 \leq y \leq 0.150$, $0.200 \leq z \leq 0.280$), $LiMn_xCo_yNi_zO_2$ ($0.300 \leq x \leq 0.850$, $0.100 \leq y \leq 0.300$, $0.100 \leq z \leq 0.300$), $LiMn_{1.5}Ni_{0.5}O_4$, and the like. These compounds may be mixed alone or two or more thereof may be mixed in combination.

As for the electrolyte, the separator and the shapes of a lithium-ion secondary battery, those similar as in the above-described case where the organic sulfur material is used as a positive electrode active material can be used in the similar manner.

EXAMPLE

Although the present disclosure will be described based on Examples, it is not limited to Examples.

Various chemicals used in Examples and Comparative examples are collectively shown below. They were purified according to a conventional method as required.

<Materials Used for Test>

Acrylic resin 1: Spherical acrylic resin consisting of a copolymer of methyl methacrylate and ethylene glycol dimethacrylate (TECHPOLYMER MB30X-8 manufactured by Sekisui Kasei Co., Ltd., particle size: 8 μm)

Acrylic resin 2: Spherical acrylic resin consisting of a copolymer of butyl methacrylate and ethylene glycol dimethacrylate (TECHPOLYMER BM30X-8 manufactured by Sekisui Kasei Co., Ltd., particle size: 8 μm)

Acrylic resin 3: Spherical acrylic resin consisting of a copolymer of methyl methacrylate and ethylene glycol dimethacrylate (TECHPOLYMER MB30X-20 manufactured by Sekisui Kasei Co., Ltd., particle size: 20 μm)

Acrylic resin 4: Porous acrylic resin consisting of a copolymer of methyl methacrylate and ethylene glycol dimethacrylate (TECHPOLYMER MBP-8 manufactured by Sekisui Kasei Co., Ltd., particle size: 8 μm)

Acrylic resin 5: Spherical acrylic resin consisting of a homopolymer of methyl methacrylate (TECHPOLYMER MB-8 manufactured by Sekisui Kasei Co., Ltd., particle size: 8 μm)

Acrylic resin 6: Spherical acrylic resin consisting of a homopolymer of methyl methacrylate (PARAPET GF-P manufactured by Kuraray Co., Ltd., particle size: 270 μm)

Acrylic resin 7: Spherical acrylic resin consisting of a copolymer of butyl methacrylate and ethylene glycol dimethacrylate (TECHPOLYMER BM30X-5 manufactured by Sekisui Kasei Co., Ltd., particle size: 5 μm)

Acrylic resin 8: Spherical acrylic resin consisting of a copolymer of methyl methacrylate and ethylene glycol dimethacrylate (TECHPOLYMER MB30X-5 manufactured by Sekisui Kasei Co., Ltd., particle size: 5 μm)

Acrylic resin 9: Spherical acrylic resin consisting of a copolymer of butyl methacrylate and ethylene glycol dimethacrylate (TECHPOLYMER BM30X-12 manufactured by Sekisui Kasei Co., Ltd., particle size: 12 μm)

Acrylic resin 10: Spherical acrylic resin consisting of a copolymer of butyl methacrylate and ethylene glycol dimethacrylate (GANZPEARL GB-15S manufactured by Aica Kogyo Co., Ltd., particle size: 15 μm)

High cis BR: High cis butadiene rubber (BR150L manufactured by Ube Industries, Ltd., cis 1,4 bond content=98% by mass)

PAN: Polyacrylonitrile (manufactured by Sigma-Aldrich, particle size: 8 μm)

Sulfur: Precipitated sulfur manufactured by Tsurumi Chemical Industry Co., Ltd.

Example 1

<Production of Raw Materials>

According to the formulation shown in Table 2, materials were mixed in a blender to obtain a raw material for calcination (calcinated raw material).

(Reaction Apparatus)

A reaction apparatus 1 shown in FIG. 1 was used for calcinating a raw material. The reaction apparatus 1 comprises a reaction vessel 3 with an outer diameter of 60 mm, an inner diameter of 50 mm, and a height of 300 mm made of a quartz glass having a bottomed cylindrical shape for accommodating and calcinating a raw material 2, a lid 4 made of silicone for closing an upper opening of the reaction vessel 3, one alumina protective tube 5 penetrating the lid 4 ("Alumina SSA-S" manufactured by Nikkato Corporation, outer diameter: 4 mm, inner diameter: 2 mm, length: 250 mm), a pair of gas introduction tube 6 and a gas discharge tube 7 (for both, "Alumina SSA-S" manufactured by Nikkato Corporation, outer diameter: 6 mm, inner diameter: 4 mm, length: 150 mm), and an electric furnace 8 for heating the reaction vessel 3 from the bottom side (a crucible furnace, opening width: φ80 mm, heating height: 100 mm).

The alumina protective tube 5 is formed to have a length below the lid 4 that reaches the raw material 2 accommodated in the bottom of the reaction vessel 3, and a thermocouple 9 is inserted therein. The alumina protective tube 5 is used as a protective tube for the thermocouple 9. The tip of the thermocouple 9 is inserted into the raw material 2 while being protected by the closed tip of the alumina protective tube 5 and functions to measure temperature of the raw material 2. An output of the thermocouple 9 is input to a temperature controller 10 of the electric furnace 8 as shown by the arrow with solid line in the figure, and the temperature controller 10 functions to control the heating temperature of the electric furnace 8 based on this input from the thermocouple 9.

The lower ends of the gas introduction tube 6 and the gas discharge tube 7 are formed so as to protrude downward from the lid 4 by 3 mm. Ar (Argon) gas is continuously supplied from a gas supply system (not shown) to the gas introduction tube 6. In addition, the gas discharge tube 7 is connected to a trap tank 12 accommodating a sodium hydroxide aqueous solution 11. An exhaust gas going out of the reaction vessel 3 through the gas discharge tube 7 is once passed through the sodium hydroxide aqueous solution 11 in the trap tank 12 and then discharged to the outside. Therefore, even if the exhaust gas contains a hydrogen sulfide gas generated by a vulcanization reaction, the hydrogen sulfide gas is neutralized with the sodium hydroxide aqueous solution and removed from the exhaust gas.

(Calcinating Step)

First, Ar gas was continuously supplied at a flow rate of 80 mL/min from the gas supply system with the raw material 2 being accommodated in the bottom of the reaction vessel 3, and 30 minutes after the initiation of the supply, heating by the electric furnace 8 was initiated. The heating was performed at a temperature rising rate of 150° C./h. And when the temperature of the raw material reached the calcinating temperature in Table 2 (400° C.), calcination was performed for 2 hours while maintaining the calcinating temperature of 400° C. Next, while adjusting the flow rate of Ar gas, temperature of a reaction product was naturally cooled to 25° C. under an Ar gas atmosphere, and then the reaction product was taken out from the reaction vessel 3.

(Removal of Unreacted Sulfur)

The following steps were performed in order to remove unreacted sulfur (elemental sulfur in a free state) remaining in the product after the calcinating step. That is, the product was pulverized in a mortar, and 2 g of the pulverized product was accommodated in a glass tube oven and heated at 250° C. for 3 hours while being sucked by a vacuum to obtain an organic sulfur material in which unreacted sulfur were removed (or which comprises a small amount of unreacted sulfur only). The temperature rising rate was set to be 10° C./min.

(Classification)

In order to remove coarse particles of a calcinated product, classification was performed by using a 32 μm mesh stainless steel sieve to obtain an organic sulfur material 1.

<Production of Lithium-Ion Secondary Battery>

A lithium-ion secondary battery was produced as follows.

(Positive Electrode)

The organic sulfur material 1 as an active material, acetylene black as a conductive auxiliary agent, and acrylic resin as a binder were used. They were weighed so as to have a ratio of the active material:the conductive auxiliary agent: the binder=90:5:5 (mass ratio), placed in a container, stirred and mixed with a rotating and revolving mixer (ARE-250 manufactured by Thinky Corporation) using milliQ water as a dispersant to produce a uniform slurry. The produced slurry was coated onto an aluminum foil having a thickness of 20 μm using an applicator having a slit width of 60 μm, and a positive electrode compressed with a roll press was dried by heating at 120° C. for 3 hours with a dryer, followed by punched to φ11 to obtain an electrode (a positive electrode). Then, a weight of the positive electrode was measured, and an amount of the active material in the electrode was calculated from the ratio mentioned above.

(Negative Electrode)

As a negative electrode, a metallic lithium foil (a disk shape foil with a diameter of 14 mm and a thickness of 500 μm, manufactured by Honjo Metal Co., Ltd.) was used.

(Electrolytic Solution)

As an electrolytic solution, a non-aqueous electrolyte in which $LiPF_6$ was dissolved in a mixed solvent of ethylene carbonate and diethyl carbonate was used. Ethylene carbonate and diethyl carbonate were mixed at a volume ratio of 1:1. A concentration of $LiPF_6$ in the electrolytic solution was 1.0 mol/L.

(Lithium-Ion Secondary Battery)

A coin battery was produced using the positive electrode and the negative electrode described above. Specifically, in a dry room, a separator (Celgard 2400 manufactured by Celgard, LLC, polypropylene microporous film having a thickness of 25 μm) and a glass non-woven fabric filter (thickness: 440 μm, GA100 manufactured by ADVANTEC) were interposed between the positive electrode and the negative electrode to form an electrode body battery. This electrode body battery was accommodated in a battery case composed of a stainless-steel container (CR2032 type coin battery member, manufactured by Hohsen Corp.). The above-described electrolytic solution was injected into the battery case. The battery case was sealed with a caulking machine to produce a lithium-ion secondary battery of Example 1.

Examples 2 to 15 and Comparative Examples 1 to 2

Each calcinated raw material, organic sulfur material, and lithium-ion secondary battery were produced in the same manner as in Example 1 except that appropriate changes were made according to the compounding formulations and conditions in Tables 2 and 3.

<Discharge Capacity and Measurement of Capacity Retention>

The coin-type lithium-ion secondary battery produced in each Example and Comparative example was charged and discharged with a current value corresponding to 50 mA per 1 g of a positive electrode active material under a condition of a test temperature at 30° C. for the first to 9th time, and charged and discharged with a current value corresponding to 250 mA for the 10th to 30th time. A discharge final voltage was set to be 1.0 V, and a charge final voltage was set to be 3.0 V. In addition, the charging/discharging was repeated, and the 10th and 30th battery discharge capacities (mAh) were observed.

The second discharge capacity (mAh/g) was regarded as an initial capacity. It can be evaluated that the larger the initial capacity is, the larger the charge/discharge capacity of the lithium-ion secondary battery is, which is preferable. Moreover, from the $10^{th}$ discharge capacity $DC_{10}$ (mAh/g) and the 30th discharge capacity $DC_{30}$ (mAh/g), a capacity retention (%) was calculated by the following equation (a):

$$\text{Capacity retention}(\%) = (DC_{30}/DC_{10}) \times 100 \quad (a)$$

As described above, it can be said that the higher the capacity retention is, the more excellent the cycle characteristics of the lithium-ion secondary battery is.

<Elemental Analysis>

Elemental analysis on the organic sulfur materials produced in Examples and Comparative examples was performed.

For carbon, hydrogen, sulfur, and nitrogen, a mass ratio (%) to a total amount of the organic sulfur materials was calculated from each mass measured using a fully automatic elemental analyzer, vario MICRO cube manufactured by Elementar. The results are shown in Tables 2 and 3.

<Raman Spectrum>

The Raman spectrum was measured by the above-described method. The results for the organic sulfur materials in Examples 1 and 7 and Comparative examples 1 and 2 are shown in FIG. 2. FIG. 2 parallelly shows each Raman spectrum under the same horizontal axis (wave number ($cm^{-1}$)) so that its peak positions can be compared.

TABLE 2

|  | Example | | | | | | Comparative example | |
| --- | --- | --- | --- | --- | --- | --- | --- | --- |
|  | 1 | 2 | 3 | 4 | 5 | 6 | 1 | 2 |
| Electrode Calcinated raw material Compounding (part by mass) | | | | | | | | |
| Acrylic resin 1 | 100 | — | — | — | — | — | — | — |
| Acrylic resin 2 | — | 100 | — | — | — | — | — | — |
| Acrylic resin 3 | — | — | 100 | — | — | — | — | — |
| Acrylic resin 4 | — | — | — | 100 | — | — | — | — |
| Acrylic resin 5 | — | — | — | — | 100 | — | — | — |
| Acrylic resin 6 | — | — | — | — | — | 100 | — | — |
| High cis BR | — | — | — | — | — | — | 100 | — |
| PAN | — | — | — | — | — | — | — | 100 |
| Sulfur | 300 | 300 | 300 | 300 | 300 | 300 | 300 | 300 |
| Calcination | | | | | | | | |
| Calcinating temperature (° C.) | 400 | 400 | 400 | 400 | 400 | 400 | 400 | 400 |
| Elemental analysis (%) | | | | | | | | |
| C | 39.0 | 40.1 | 41.0 | 39.9 | 41.1 | 41.4 | 44.0 | 39.2 |
| H | 0.45 | 0.21 | 0.26 | 0.68 | 0.72 | 0.35 | 0.39 | 0.91 |
| N | 0.03 | 0.02 | 0.05 | 0.04 | 0.04 | 0.03 | 0.26 | 13.9 |
| S | 60.1 | 62.0 | 59.8 | 59.3 | 56.6 | 55.1 | 57.6 | 43.3 |
| Evaluation on battery Discharge capacity (mAh/g) | | | | | | | | |
| First | 880 | 879 | 853 | 927 | 857 | 797 | 855 | 705 |
| Second | 651 | 656 | 619 | 679 | 646 | 608 | 543 | 613 |
| $10^{th}$ | 530 | 521 | 476 | 511 | 539 | 520 | 401 | 512 |
| $30^{th}$ | 515 | 503 | 455 | 476 | 526 | 518 | 333 | 499 |
| Capacity retention (%) | 97 | 97 | 96 | 93 | 98 | 99 | 83 | 97 |

TABLE 3

|  | Example | | | | | | | | |
| --- | --- | --- | --- | --- | --- | --- | --- | --- | --- |
|  | 7 | 8 | 9 | 10 | 11 | 12 | 13 | 14 | 15 |
| Electrode Calcinated raw material Compounding (part by mass) | | | | | | | | | |
| Acrylic resin 7 | 100 | — | — | — | 100 | 100 | 100 | 100 | 100 |
| Acrylic resin 8 | — | 100 | — | — | — | — | — | — | — |
| Acrylic resin 9 | — | — | 100 | — | — | — | — | — | — |
| Acrylic resin 10 | — | — | — | 100 | — | — | — | — | — |

TABLE 3-continued

| | Example | | | | | | | | |
|---|---|---|---|---|---|---|---|---|---|
| | 7 | 8 | 9 | 10 | 11 | 12 | 13 | 14 | 15 |
| High cis BR | — | — | — | — | — | — | — | — | — |
| PAN | — | — | — | — | — | — | — | — | — |
| Sulfur | 300 | 300 | 300 | 300 | 200 | 500 | 1000 | 300 | 300 |
| Calcination | | | | | | | | | |
| Calcinating temperature (° C.) | 400 | 400 | 400 | 400 | 400 | 400 | 400 | 370 | 430 |
| Elemental analysis (%) | | | | | | | | | |
| C | 38.4 | 40.5 | 39.6 | 40.5 | 41.2 | 40.3 | 40.8 | 40.5 | 40.2 |
| H | 0.25 | 0.31 | 0.39 | 0.49 | 0.43 | 0.29 | 0.38 | 0.37 | 0.19 |
| N | 0.03 | 0.03 | 0 | 0 | 0.05 | 0 | 0.05 | 0 | 0.12 |
| S | 63.8 | 58.4 | 61.6 | 57.5 | 57.3 | 59.5 | 59.9 | 59.4 | 61.2 |
| Evaluation on battery Discharge capacity (mAh/g) | | | | | | | | | |
| First | 922 | 858 | 901 | 850 | 864 | 842 | 819 | 880 | 825 |
| Second | 701 | 642 | 691 | 636 | 647 | 620 | 605 | 661 | 613 |
| 10$^{th}$ | 581 | 527 | 579 | 513 | 528 | 532 | 497 | 545 | 508 |
| 30$^{th}$ | 577 | 518 | 575 | 508 | 518 | 532 | 497 | 545 | 508 |
| Capacity retention (%) | 99 | 98 | 99 | 99 | 98 | 100 | 100 | 100 | 100 |

From Tables 2 and 3, it can be seen that a higher initial capacity (mAh/g) is shown and the capacity retention (%) is maintained at a higher level in Examples, compared with Comparative example 1. Comparative example 2 shows high initial capacity and capacity retention, but it uses expensive polyacrylonitrile as a raw material, and thus it is less likely to be provided at a low cost. According to the organic sulfur material of the present disclosure, a lithium-ion secondary battery having a high initial capacity and a good capacity retention can be provided inexpensively.

EXPLANATION OF NUMERALS

1. Reaction apparatus
2. Raw material
3. Reaction vessel
4. Silicone lid
5. Alumina protective tube
6. Gas introduction tube
7. Gas discharge tube
8. Electric furnace
9. Thermocouple
10. Temperature controller
11. Sodium hydroxide aqueous solution
12. Trap tank
A. Difference between peak intensity around 1450 cm$^{-1}$ and corresponding baseline intensity
B. Difference between peak intensity around 1540 cm$^{-1}$ and corresponding baseline intensity

What is claimed is:

1. An organic sulfur material comprising:
a sulfur-modified acrylic resin formed by calcination of sulfur and an acrylic resin wherein the amount of sulfur in the organic sulfur material is 50.0% by mass or more, and
wherein the acrylic resin is a copolymer formed from a monomer of at least one selected from the group consisting of acrylate compounds represented by the following formula (1) and a monomer of at least one selected from the group consisting of diacrylate compounds represented by the following formula (2),

wherein R$^{11}$ is a hydrogen atom or a methyl group, and R$^{12}$ is an alkyl group,

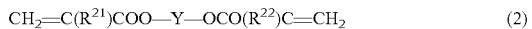

wherein
each of R$^{21}$ and R$^{22}$ is the same or different and is a hydrogen atom or a methyl group,
Y is a hydrocarbylene group, wherein the hydrocarbylene group may have at least one substituent selected from the group consisting of a hydroxyl group and an alkyl group,
a carbon skeleton constituting the hydrocarbylene group may have an ether bond with an oxygen atom, and
when there are two or more ether bonds, two or more carbon atoms always intervene between the adjacent oxygen atoms.

2. The organic sulfur material of claim 1, wherein the modification is performed by calcination under a non-oxidizing atmosphere.

3. The organic sulfur material of claim 1, wherein R$^{12}$ is an alkyl group having 1 to 6 carbon atoms, wherein Y is a hydrocarbylene group having 2 to 6 carbon atoms, wherein the hydrocarbylene group has 1 to 4 substituents, wherein the alkyl group, which is a substituent, has 1 to 4 carbon atoms, and wherein the carbon skeleton constituting the hydrocarbylene group has 1 or 2 ether bonds.

4. The organic sulfur material of claim 1, wherein a particle size of the acrylic resin is 0.1 to 300.0 μm.

5. The organic sulfur material of claim 1, wherein the acrylic resin has a porous structure.

6. The organic sulfur material of claim 1, wherein, in a Raman spectrum detected by Raman spectroscopy, there exists a main peak around 1450 cm$^{-1}$, and there exists other peaks around 485 cm$^{-1}$, around 1250 cm$^{-1}$, and around 1540 cm$^{-1}$ in a range of 200 to 1800 cm$^{-1}$.

7. The organic sulfur material of claim 6, wherein, in the Raman spectrum, with a straight line connecting an intensity of 1000 cm$^{-1}$ and an intensity of 1800 cm$^{-1}$ being as a baseline, when a difference ($I_{1450}$) between a peak intensity around 1450 cm$^{-1}$ and a corresponding baseline intensity and a difference ($I_{1540}$) between a peak intensity around 1540 cm$^{-1}$ and a corresponding baseline intensity are calculated, a value of $I_{1450}/I_{1540}$ is in a range of 1 to 4.

8. The organic sulfur material of claim 1, wherein the acrylic resin is at least one polymer selected from the group consisting of a polymer of at least one selected from the group consisting of acrylate compounds represented by the formula (1).

9. An electrode comprising the organic sulfur material of claim 1.

10. A lithium-ion secondary battery comprising the electrode of claim 9.

11. A method of producing an organic sulfur material, the method comprising steps of:
(1) preparing an acrylic resin, and
(2) modifying the acrylic resin with sulfur by calcination of the acrylic resin and sulfur,
wherein the acrylic resin is a copolymer formed from a monomer of at least one selected from the group consisting of acrylate compounds represented by the following formula (1) and a monomer of at least one selected from the group consisting of diacrylate compounds represented by the following formula (2),

$$CH_2=C(R^{11})COOR^{12} \quad (1)$$

wherein $R^{11}$ is a hydrogen atom or a methyl group, and $R^{12}$ is an alkyl group,

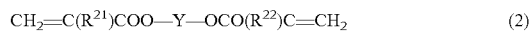

$$CH_2=C(R^{21})COO-Y-OCO(R^{22})C=CH_2 \quad (2)$$

wherein
each of $R^{21}$ and $R^{22}$ is the same or different and is a hydrogen atom or a methyl group, Y is a hydrocarbylene group, wherein the hydrocarbylene group may have at least one substituent selected from the group consisting of a hydroxyl group and an alkyl group,
a carbon skeleton constituting the hydrocarbylene group may have an ether bond with an oxygen atom, and
when there are two or more ether bonds, two or more carbon atoms always intervene between the adjacent oxygen atoms, and
wherein the amount of sulfur in the organic sulfur material is 50.0% by mass or more.

12. The method of claim 11, wherein the modification is performed by calcination under a non-oxidizing atmosphere.

13. The method of claim 11, wherein an amount of the sulfur with respect to the acrylic resin is 50 to 1000 parts by mass based on 100 parts by mass of the acrylic resin.

14. The method of claim 12, wherein a temperature of the calcination is 250 to 550° C.

15. The method of claim 11, wherein a particle size of the acrylic resin is 0.1 to 300.0 μm.

16. The method of claim 11, wherein the acrylic resin has a porous structure.

17. A method of producing an electrode, the method further comprising, after producing the organic sulfur material by the method of claim 11, a step of:
(3) preparing an electrode by incorporating the organic sulfur material.

18. A method of producing a lithium-ion secondary battery, the method further comprising, after producing the electrode by the method of claim 17, a step of:
(4) preparing a lithium-ion secondary battery by incorporating the electrode.

* * * * *